US006456601B1

United States Patent
Kozdon et al.

(12) United States Patent
(10) Patent No.: US 6,456,601 B1
(45) Date of Patent: Sep. 24, 2002

(54) METHOD AND SYSTEM TO PROVIDE TELEPHONY TONES AND ANNOUNCEMENTS IN A PACKETIZED NETWORK ENVIRONMENT

(75) Inventors: Peter Kozdon, Santa Clara, CA (US); Markku Korpi, Starnberg (DE); Rudolph Bitzinger, Munich (DE); Shmuel Shaffer, Palo Alto, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/326,017

(22) Filed: Jun. 4, 1999

(51) Int. Cl.$^7$ ............................................... H04L 12/16
(52) U.S. Cl. .................... 370/259; 370/338; 379/68; 379/88.17; 455/414
(58) Field of Search ................. 370/259, 270, 370/271, 328, 338, 466, 467, 352, 353, 354, 355, 356; 379/67.1, 68, 70, 71, 72, 76, 88.19, 88.22, 88.17; 455/414, 415, 416, 417

(56) References Cited

U.S. PATENT DOCUMENTS

| | | | | |
|---|---|---|---|---|
| 6,118,864 A | * | 9/2000 | Chang et al. | 370/352 |
| 6,141,341 A | * | 10/2000 | Jones et al. | 370/352 |
| 6,285,683 B1 | * | 9/2001 | Lin | 370/466 |
| 6,324,263 B1 | * | 11/2001 | Sherwood et al. | 379/88.19 |
| 6,385,194 B2 | * | 5/2002 | Surprenant et al. | 370/353 |

* cited by examiner

Primary Examiner—Nay Maung

(57) ABSTRACT

A method and a system of providing call progress tones in a packetized network include storing the call progress tones and pre-programmed audio deliveries at a first device and includes multicasting or broadcasting the tones and deliveries from the first device to a number of telephony-enabled devices. The multicasts are in a format that enable the telephony-enabled devices to individually control transmissions of the tones and deliveries to other devices, particularly calling devices for incoming calls. Typically, the audio deliveries include memory intensive signals, such as announcements and music-on-hold. The progress tones include conventional call status tones, such as ringback, busy and error tones. In one embodiment, the telephony-enabled devices are telephones to which the calls are directed. In another embodiment, the telephony-enabled devices include proxies that process the system-wide multicasts for telephones of the network. Optionally, all of the tones and deliveries may be multiplexed into a single data stream. The multiplexed multicast data stream is then processed when a particular tone or delivery must be extracted. Optionally, less frequent announcements can be multiplexed into a generally continuous data stream for periodic presentation to a particular type of caller, such as a periodic selection of a particular message that interrupts music-on-hold. In another possible modification, the data stream is not processed at a called telephone. Instead, the called telephone directs the selected multicast to the calling telephone, which provides the processing.

20 Claims, 3 Drawing Sheets

METHOD AND SYSTEM TO PROVIDE TELEPHONY TONES AND ANNOUNCEMENTS IN A PACKETIZED NETWORK ENVIRONMENT

BACKGROUND OF THE INVENTION

The invention relates generally to audible telecommunications signaling and, more specifically, to a method and a system for providing call progress tones and audible announcements in a distributed, packetized network environment.

DESCRIPTION OF THE RELATED ART

In conventional analog telephony, the central office of the Public Switch Telephone Network (PSTN) provides subscriber telephones with call progress tones so that callers are able to ascertain the status of a call. These audible tones are in addition to any network signaling messages which are used by the central office or by a private branch exchange (PBX) for controlling and managing calls. The audible tones are generally provided as notification to the user. For example, when a caller takes a telephone off-hook, the central office provides the caller with a dial tone which indicates to the caller that the central office is ready to accept and process dialed digits from the caller. If no dial tone is received after going off-hook, this indicates to the caller that the resources of the central office are not currently available for processing an outgoing call.

If the central office receives a call for a customer who is already on the line with another call (i.e., the customer's phone is in an off-hook condition), the central office may transmit a busy signal to the caller. Alternatively, if the called customer number is not valid, the central office may transmit an error tone to inform the customer that a call cannot be completed. Another example of a call progress tone that the central office provides to a caller is the ringback tone. When a call reaches a phone that is not busy (i.e., on hook), the central office provides the caller with a ringback tone to inform the caller that the line is not busy and that alerting (a ringing voltage) is being applied to the destination of the call.

A PBX is a telephone switch which performs many of the same functions as a central office. A PBX is typically employed to provide local telephony support to a business facility. In addition to the call progress tones provided by central offices, a PBX typically responds to an incoming call being placed on hold by presenting background music or a voice recording which lets the caller know that he or she has not been disconnected and should remain on the call. A PBX that enables an ACD (Automatic Call Distribution) function may provide a variety of pre-programmed audio deliveries to the caller, including music-on-hold, information, promotional and other status messages.

In both the central office and the PBX, there is a central switch fabric having shared resources which provide call progress or status tones, announcements, and/or music-on-hold. In contrast, there are no central resources or central switch fabric in a Local Area Network (LAN) which is equipped for distributed, Telephony-over-LAN (ToL) services. Typically, in a ToL environment, every endpoint is a telephony-enabled device that stores tones for call progress tones, as well as announcements and on-hold music. When a call status tone is required (e.g., when a called endpoint is participating in a first call at the time that it receives a second call from a second endpoint), the called endpoint accesses a locally stored audio file and transmits a busy tone or a message to the calling endpoint. Alternatively, in some digital networks a signaling network message may be sent to the calling endpoint and the tone may be played locally to the calling party.

Although call status tones do not require significant memory, storage space or processing power to generate, more sophisticated call progress tones and pre-programmed audio deliveries (such as voice announcements, messages and background music) require substantially greater storage and processing power in each endpoint. Even though the cost per endpoint may be small, in a large network system with many endpoints, the total cost can become significant. Furthermore, storing messages and background music at the endpoints presents significant network management difficulties. In the case of music-on-hold, there must be sufficient variations so as not to annoy the party on hold, and this requirement may lead to very large storage memory requirements. For example, if the endpoints are agent terminals associated with an ACD, the on-hold music and messages are likely to be changed frequently. Updating the memory of all endpoints each time the on-hold music and messages are changed is an inefficient network management technique. Additionally, transmitting call status signals and on-hold music and announcements from each network endpoint introduces a substantial amount of traffic onto the network.

What is needed is a system and a method for efficiently providing progress tones and pre-programmed audio deliveries to endpoints in a connectionless network environment.

SUMMARY OF THE INVENTION

A method and system for providing call progress tones and pre-programmed audio deliveries in a distributed network environment that supports data transfers and telephony capability for a number of telephony-enabled devices includes storing the call progress tones and pre-programmed deliveries at a master device, such as a dedicated server, and multicasting the signals in a format that enables the telephony-enabled devices to individually control transmissions of the progress tones and deliveries to other devices. Typically, the call pre-programmed audio deliveries include memory intensive signals, such as announcements and music-on-hold. The method and system are best suited for applications in networks which transfer information in packets, i.e., "connectionless" networks.

In one embodiment, each call progress tone and/or each audio delivery (e.g., music-on-hold) that is stored at the multicast source is associated with a unique multicast address. A telephony-enabled device (e.g., a computer), can request recurring delivery of a particular announcement by identifying the multicast address. Typically, each telephony-enabled device registers for a number of the call progress tones and deliveries. Each device in a multicast group can then control transmissions of specific call progress tones and deliveries to other devices.

In another embodiment, the call progress tones and/or pre-programmed audio deliveries are multiplexed into a single data stream. The telephony-enabled device can then select one of the tones or audio deliveries to play to the other device. For example, in an Automatic Call Distributor (ACD) system, the multicast multiplexed data stream may include the music-on-hold that provides a continuous background source when an ACD device is unavailable. Other less frequent announcements can be multiplexed into the same data stream for periodic presentation to a specific type of caller. Thus, the ACD device can periodically select an alternate announcement (from the multiplex stream) and interrupt the music-on-hold. This announcement can be specifically tailored for an identified type of caller.

The manipulation of the multicast stream to select and direct the appropriate music or other information tones or announcements may occur exclusively at a telephone or work station. In one scenario, a telephone that is engaged in a first call may place the caller on hold in order to consult with another party via a second call. The telephone that placed the first call on hold receives the multicast packets in which the music-on-hold information is embedded and relays the extracted packets to the other telephone of the first call. When the second call is completed, and the telephone is taken off hold, the conversation can continue normally. In a second scenario, the telephone receives a second call while the telephone is in an off-hook condition. A "busy" signal may be selected from the multiplexed multicast data stream for relay to the telephone of the incoming call. The selection of the call progress tones and audio deliveries may be achieved using Computer Telephony Integration (CTI) applications and/or telephony control messages.

As an alternative to manipulating the multicast at the telephony devices, proxy devices may be utilized in order to reduce network traffic. In this alternative, the proxy devices are the telephony-enabled devices. These proxy devices should generally be located near the points at which the signals are needed, e.g., positioned so as to be near the points at which the call progress tones or deliveries are to be transmitted. Each proxy device receives multicast signals from the multicast source and handles the held calls on behalf of the original device, e.g. the one that put the call on hold. The proxy device does not need to create or store the call progress tones or pre-programmed audio deliveries. Therefore, the proxy device may be a small unit for which administration is relatively simple.

As another alternative, the telephony-enabled devices can instruct the other telephony-enabled device (i.e., the one not on hold) to receive and process the multicast signals in order to deliver the desired call progress tones to the user. The utilization of the second or third option will generally require a capabilities exchange between the two devices on the call and/or with the proxy device to make sure that the mode of operation is possible and to control the selection of tones, announcements or music.

DETAILED DESCRIPTION

Figure 1:
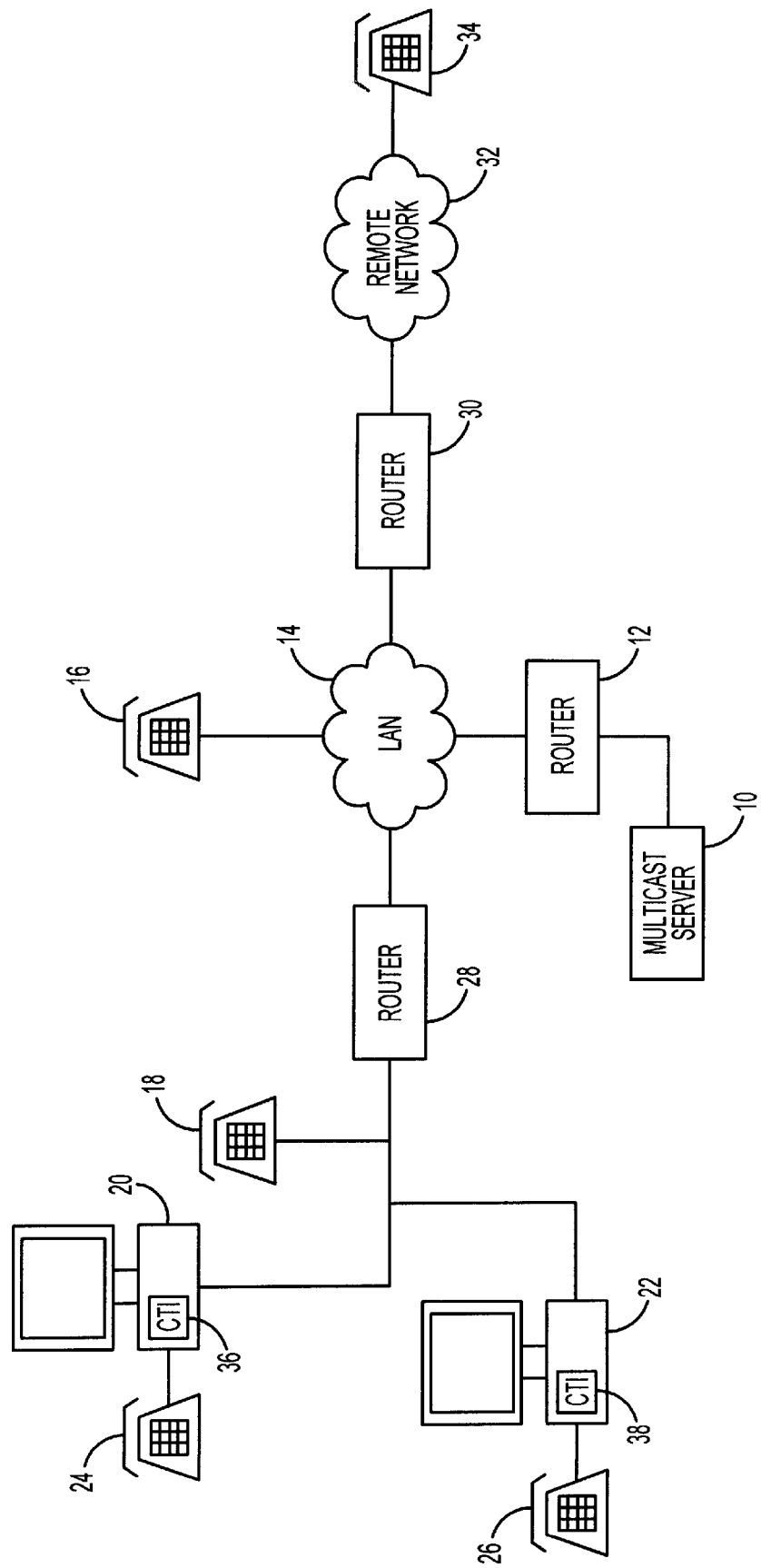
FIG. 1 is a block diagram of a first embodiment of a network environment in which call progress tones and pre-programmed audio deliveries (e.g., music-on-hold and announcements) are multicast from a single source for redirection in accordance with the invention.

With reference to FIG. 1, a network environment for providing call progress tones and pre-programmed audio deliveries within a packet-based network environment (i.e., connectionless network) includes a multicast server 10 for storing or creating the tones or deliveries. These include, but are not limited to, music-on-hold, announcements, and call status tones. Examples of announcements stored at the multicast server include audio messages that a called party is on another line or is not presently at his or her desk. Examples of call status tones include busy, ringback, error and others. Announcements can also be created or generated at this server, such as date and time or current waiting time in an ACD queue.

A first router 12 is positioned to transmit the call progress tones within the network environment. The multicast server 10 and the router may be conventional network devices. Each of the call progress tones or pre-programmed audio deliveries at the server 10 may be associated with a unique multicast address. Telephony-enabled devices within the network may obtain a particular call progress tone by registering to the specific multi-cast group. This registration may be achieved by identifying the multicast address for the desired tone or delivery. The routers (or alternatively LAN switches)12, 28 and 30 then deliver the multicasts, based upon registrations, to all the devices requiring that service. In FIG. 1, the network is a Local Area Network (LAN) 14, but this is not essential to the invention. The network environment may also include a Wide Area Network (WAN) Intranet or a similar network.

Four telephony-enabled devices are shown as being supported by the LAN 14. The illustrated devices are two stand-alone telephones 16 and 18 and two workstations defined by computers 20 and 22 and telephones 24 and 26. A second router 28 is used to facilitate transmissions to and from the telephone 18 and the two workstations. Traffic within the network environment typically includes data transfers as well as the telephony information.

The call progress tones and pre-programmed audio deliveries from the multicast server 10 are transmitted to all of the telephony-enabled services that register to receive the signals. Optionally, rather than having multiple multicast streams, the tones or deliveries may be multiplexed into a single data stream that can be broadcast to all the devices or multicast to registered devices. Within the multiplexed data stream, the devices may select particular signals for retransmission to other devices. In FIG. 1, a third router 30 links the LAN 14 to a remote network 32. The remote network may be the Public Switch Telephone Network (PSTN), the global communications network referred to as the Internet, or another LAN. For purposes of simplicity, only one stand-alone telephone 34 is shown as being supported by the remote network 32. Retransmissions of the call progress tones and deliveries may be from one of the computers 20 and 22 or the telephones 16 and 18 to the remote telephone 34.

In one possible scenario, a calling telephone, such as the remote phone 34, initiates a call to the telephone 24 that is supported by the LAN 14. If the telephone 24 is in an on-hook condition and the person is available, the call will be answered and a conversation will be initiated. During the call, the person at the telephone 24 may wish to consult with a person at the telephone 16. Call progress tones and audio deliveries along the multicast may be directed by the called telephone 24 to the remote telephone 34. For example, the called telephone 24 may place the remote telephone on hold and may direct music-on-hold from the multicast packets in which the music is embedded. The music-on-hold is redirected to the remote telephone 34 while the telephone 24 initiates the second call to the telephone 16. When the consultation call with the telephone 16 is completed, the telephone 34 is taken "off hold" and the original conversation can continue normally.

In an alternative scenario, there may be an ongoing call when the remote telephone 34 places a call to the LAN telephone 24. In the scenario we assume that the called telephone 24 is in an off-hook condition, the second call cannot be completed. Therefore, the workstation that includes the computer 20 and the telephone 24 will redirect the appropriate tone(s), announcements, and/or music of the multicast stream from the server 10. A "busy" tone may be directed to the remote telephone 34. Alternatively, a voice-mail message may be presented to the person at the remote telephone 34. The voicemail message may include an option of remaining on hold or leaving a message. If the option of remaining on hold is selected, the computer 20 may redirect multicast packets to provide music-on-hold for the caller. The types and the content of messages in the multicast streams (whether multiplexed or not) is not critical to the invention. However, the messages should be applicable to more than one user, if the benefits of the multicast system are to be fully realized.

Figure 2:
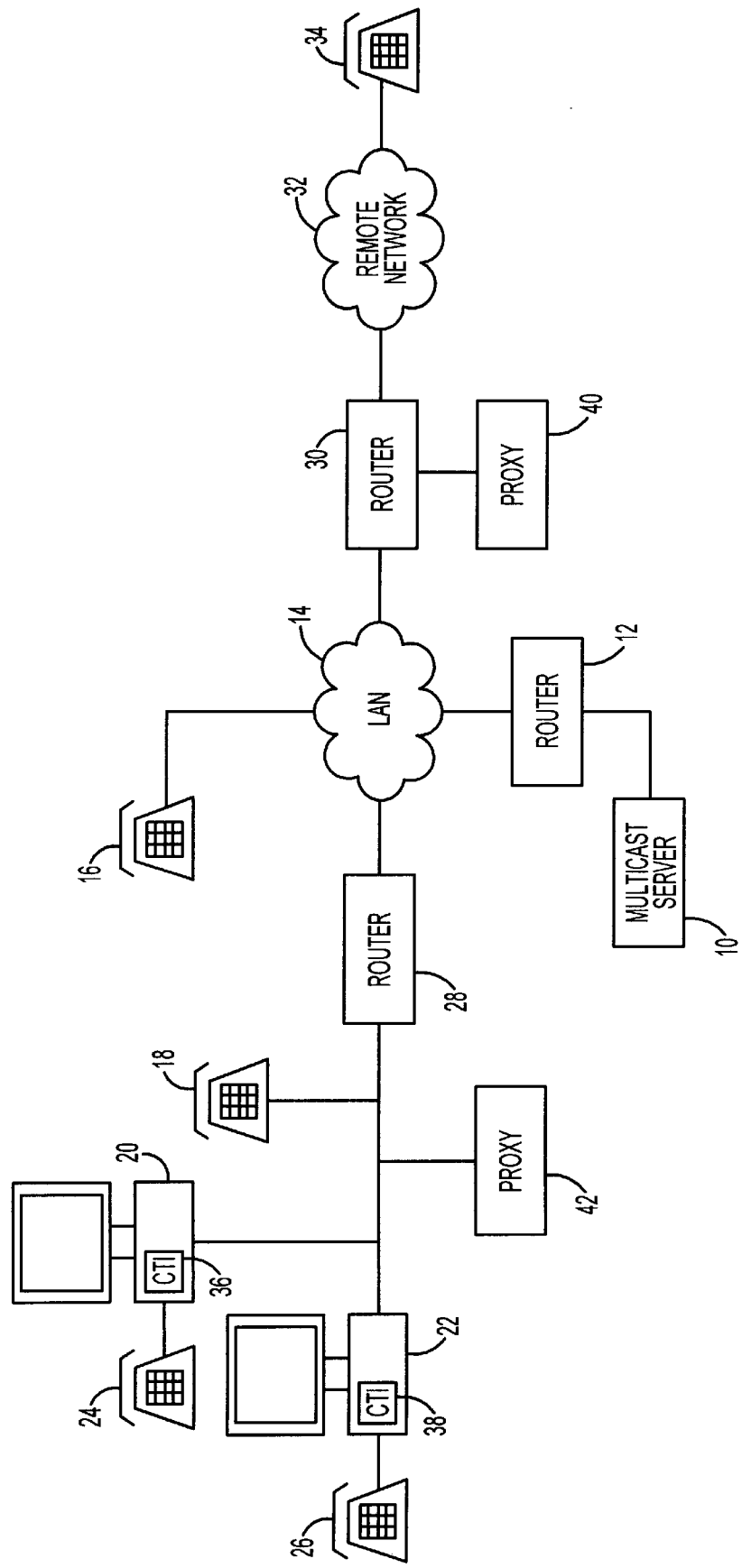
FIG. 2 is a second embodiment of a network environment having a multicast source, but with proxies that are slaves to telephony-enabled devices with respect to retransmitting the call progress tones.

The selection of which call progress tone or pre-programmed audio delivery is to be retransmitted to another telephone from the multicast and the protocol for handling incoming calls may be defined by use of local Computer Telephony Integration (CTI) applications and control messages. While other applications may be utilized, the CTI approach is preferred, since it is easily integrated into existing systems. In FIG. 2, the computers 20 and 22 are shown as having CTI applications 36 and 38. While not shown, the stand-alone telephones 16 and 18 of the LAN 14 may also include CTI applications.

In the embodiment of FIG. 1, the multicast signals from the server 10 and router 12 are received and processed at the individual telephony-enabled devices, i.e., the telephones 16 and 18 and the computers 20 and 22. An alternative embodiment is shown in FIG. 2. The network environment includes two proxies 40 and 42 that are positioned so as to be near the points at which the call progress tones or audio deliveries are to be transmitted. The call progress tones and deliveries are still multicast from the server 10 in combination with the router 12, but the proxies are used to receive and process the multicasts. In the scenario in which the telephone 24 is engaged in an ongoing call with the remote telephone 34, but the caller at the telephone 24 wishes to enter into a short consultation call with the person at telephone 16, the proxy 40 may be used. When the original telephone call goes on hold, the first call is transferred to the proxy 40. The telephone 24 uses CTI messages to control the playback of the call progress tones or audio deliveries to the party at telephone 34 from the proxy 40. The proxy 40 uses the system-wide multicast announcement service from the server 10. The proxies may be low cost devices, since they do not need to have the capability to create or store announcements, music-on-hold and call status tones. The proxy units may be small units, because they rely upon the multicast service.

In a third embodiment, the structure is similar to that of FIG. 1, but the original multicast is directed to the telephone to which the particular call progress tone is to be received. For example, in the multiplexed multicast transmission, the entire data stream may be directed to the target telephone, with a command that identifies the appropriate call progress tone or audio delivery (e.g., music-on-hold). In this third embodiment, the two telephones must have compatible applications, such as CTI applications. The degree of compatibility can be validated via a capabilities exchange.

In a possible scenario of this third embodiment, the remote telephone 34 attempts to connect to the telephone 24 while the telephone 24 is in an off-hook condition. Thus, a voice path between the two telephones cannot be established. The called telephone 24 accepts the call, but sends a CTI message instructing the calling telephone 34 to receive and process the multiplexed signal. The telephone 24 controls which message is to be extracted at the remote telephone 34. It is this control element that requires compatible applications at the two telephones. When the telephone 24 completes its call, the telephone sends a second CTI message to the calling remote phone 34. This second message instructs the phone to stop extracting from the multiplex service, and to connect to the telephone 24.

While this third embodiment allows some control of the calling telephone 34 by the called telephone 24, the control is limited. The telephone 34 can override the music-on-hold delivery, can terminate the call, and/or can allow other calls to be made. The capabilities are determined by the implementations and/or capabilities exchange.

Figure 3:
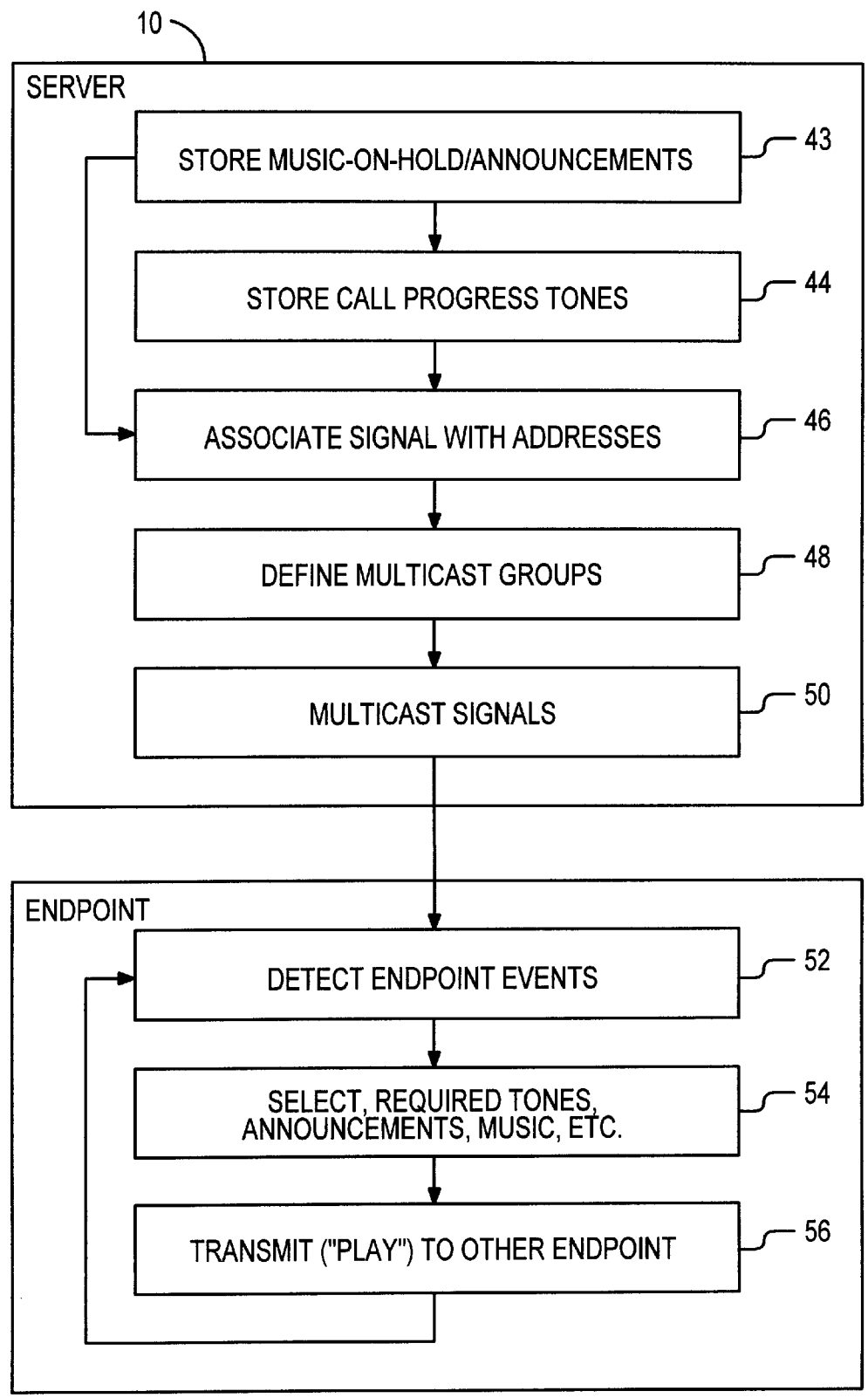
FIG. 3 is a process flow of steps for providing the call progress tones utilizing the system of FIG. 1.

Referring now to FIG. 3, a process flow of steps for utilizing any of the three embodiments described above is shown for both the server and for the telephony-enabled device. In the multicast server 10, the pre-programmed audio deliveries are stored at step 43. Additionally or alternatively, step 44 provides for storing the call progress tones, announcements, messages and optionally the music-on-hold. As an alternative to step 43, continuous music-on-hold can be delivered via step 42, from an external source, such as an external DVD player or from an Internet radio station. The signals are stored in the multicast server 10 of FIGS. 1 and 2. The announcements may also be associated with voicemail services or interactive voice response units. Examples of call status tones include busy, ringback, and error tones as well as call waiting announcements. In step 46, the stored tones and deliveries are associated with multicast addresses. This may be performed by identifying the locations in memory space at which the call progress tones and deliveries are stored within the multicast server 10 or hard disk locations of the music source. However, other techniques may be substituted.

As previously noted, in some applications the stored call progress tones are multiplexed into a single data stream that is multicast. Thus, there may be only one multicast address that is defined in step 46. In the next step 48, multicast groups are defined. The telephony-enabled devices within the network may transmit a request for registration within a multicast group by identifying the address or addresses of the desired call progress tones or the desired audio deliveries. The router 12 then directs the multicast or multicasts based upon registrations within the groups, as indicated at step 50. In the telephony-enabled (or proxy) device(s), the extraction of the appropriate tones, messages, etc. is performed by the following steps. In step 52, an event is detected as requiring one of the call progress tones or audio deliveries within the multicast or multicasts. For example, music-on-hold may be required for a call which is placed on hold. In step 54, the appropriate signal is selected. In some applications, this requires selection of one multicast stream to the exclusion of other multicast streams. However, in the applications in which a multiplexed data stream is multicast, the selection in step 54 is an election of one or more signals within the data stream to the exclusion of other signals within the data stream.

In step 56, the tones/deliveries are transmitted. In the first and second above-described embodiments that transmit only the selected information to the target computer or phone, the transmission at step 56 is not a multicast transmission. Rather, the transmission of step 56 is from the telephony-enabled device that executed the selection in step 54 and is to the telephony-enabled device that is to receive the information represented by the selected call progress tone/ delivery, a point-to-point transmission along the same path as typically used for the (voice) call. On the other hand, in the third above-described embodiment, the multicast is directed to the target telephony-enabled device. As an example of a scenario of this third embodiment, the telephone 24 may be the device which selects the appropriate call progress tone at step 54, with the target device being the remote telephone 34. The CTI application 36 of the companion computer 20 performs the selection in step 54 and instructs the compatible application in the remote phone 34 to receive and process the multicast from the server 10 and router 12. The telephony device controlling the selection of the tone, announcement, message or music then waits for the next event to select another tone, announcement, message or music or to return to the original voice call. While the invention describes extensively the use of multicast, which does provide for a significant degree of control over the distribution, the use of broadcast in place of multicast, with streaming audio is considered to be a simple extension of this invention and a virtually identical embodiment.

What is claimed is:

1. A method of providing call progress tones in a distributed network environment which supports data transfers and telephony capability for a plurality of telephony-enabled devices, said method comprising steps of:

storing said call progress tones at a first device within said network environment; and multicasting or broadcasting said call progress tones from said first device to said plurality of telephony-enabled devices in a format that enables said telephony-enabled devices to individually control transmissions of said call progress tones to calling devices as responses to incoming calls from said calling devices, thereby providing access to said call progress tones for manipulation by said telephony-enabled devices.

2. The method of claim 1 wherein said step of multicasting or broadcasting said call progress tones includes multiplexing said call progress tones into a multiplexed data stream and includes transmitting said multiplexed data stream within said network environment for manipulation by said telephony-enabled devices.

3. The method of claim 2 wherein said step of multicasting or broadcasting includes multiplexing a plurality of call tones and announcements into said multiplexed data stream such that said individual telephony-enabled devices are enabled to extract selected call tones and announcements from said multiplexed data stream for selective transmissions to said calling devices.

4. The method of claim 1 further comprising steps of storing music-on-hold at said first device and multicasting or broadcasting said music-on-hold such that said telephony-enabled devices are configured to access said music-on-hold for transmissions to said calling devices.

5. The method of claim 4 wherein said steps of storing and multicasting or broadcasting include storing and multicasting or broadcasting call status tones, including busy, ringback and error tones.

6. The method of claim 1 wherein said step of storing includes utilizing a server dedicated to said storing and wherein said step of multicasting or broadcasting includes transmitting said call progress tones from said server to telephony-enabled devices which register to receive said call process signals.

7. The method of claim 1 wherein said step of storing includes utilizing a storage server dedicated to said storing and wherein said step of multicasting or broadcasting includes transmitting said call progress tones to proxy servers that are cooperative with telephones with respect to directing said progress tones to said calling devices, said proxy servers and said telephones being said telephony-enabled devices.

8. The method of claim 1 wherein said step of multicasting includes formatting said call progress tones into packets that can later be extracted or selected by compatible Computer Telephony Integration (CTI) applications at said telephony-enabled devices.

9. The method of claim 1 wherein said steps of storing and multiplexing include providing call progress tones directed to an Automatic Call Distributor (ACD) system, where said telephony-enabled devices are ACD terminals.

10. A method of providing pre-programmed audio deliveries in a packet-based network that includes a plurality of telephony-enabled devices, said audio deliveries including at least one of music-on-hold and verbal announcements, said method comprising steps of:

channeling packets of said pre-programmed audio deliveries within said network such that said packets are available along said network without specific recurring requests for said packets;

detecting an incoming call directed to a first telephony-enabled device, said detecting occurring at said first telephony-enabled device; and selectively accessing said packets of said audio deliveries based upon availability of said first telephony-enabled device to receive said incoming call, including transmitting said selected packets to an origin of said incoming call as a response by a present state of said first telephony-enabled device, said selected packets being transmitted at the direction of said first telephony-enabled device.

11. The method of claim 10 wherein said steps of channeling, detecting and accessing are executed with packets that include embedded music-on-hold.

12. The method of claim 11 further comprising steps of channeling, detecting and accessing packets that include progress tones, including a busy signal and ringback tones.

13. The method of claim 12 wherein said steps of channeling include multiplexing said progress tones and audio deliveries into a data stream which is transmitted to said telephony-enabled devices for selection of said progress tones and said audio deliveries from said data stream.

14. The method of claim 10 further comprising repeating said steps of detecting and selectively accessing for each incoming call to each of said telephony-enabled devices.

15. A system of providing call progress tones in a network environment comprising:

a plurality of telephony-enabled devices connected in said network environment for support of data transfers and telephony capability;

a storage device having stored at least one of audio deliveries and call progress tones specific to telephony-related information;

means connected to said storage device for multicasting or broadcasting said at least one of tones and deliveries within said network environment such that said at least one is in a format compatible with manipulation by said telephony-enabled devices, said telephony-enabled devices being configured to control transmissions of said at least one following said multicasting or broadcasting.

16. The system of claim 15 wherein said storage device is a server and each said audio delivery and each said call progress tone is associated with a multicast address, each audio delivery and progress tone being multicast to each of said telephony-enabled devices from which is received a request that identifies said multicast address associated with said each audio delivery and call progress tone.

17. The system of claim 15 wherein said means for multicasting or broadcasting is configured to multiplex said at least one of said audio deliveries and said call progress tones into a data stream that is responsive to commands from said telephony-enabled devices.

18. The system of claim 15 wherein said audio deliveries stored at said storage device include music-on-hold.

19. The system of claim 18 wherein said call progress tones include telephony tones associated with signals that are utilized upon detecting that a telephony-enabled device that is a target of an incoming call is in an off-hook or on-hook condition.

20. The system of claim 15 wherein said data transfers and said multicasting are executed as transmissions of data packets, said system further comprising at least one proxy server that is responsive to said telephony-enabled devices to direct said audio deliveries and progress tones to remote devices when said telephony-enabled devices are in off-hook or on-hook conditions.

* * * * *